(12) United States Patent  (10) Patent No.: US 9,673,847 B1
Mayer et al.  (45) Date of Patent: Jun. 6, 2017

(54) APPARATUS AND METHODS FOR TRANSCEIVER CALIBRATION

(71) Applicant: ANALOG DEVICES, INC., Norwood, MA (US)

(72) Inventors: Christopher Mayer, Dover, MA (US); David J. McLaurin, Raleigh, NC (US); Martin S. McCormick, Cambridge, MA (US); Chris Angell, Cary, NC (US); Manish J. Manglani, Summerfield, CA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 14/952,706

(22) Filed: Nov. 25, 2015

(51) Int. Cl.
  *H04B 1/04* (2006.01)
  *H04L 1/00* (2006.01)
  *H04B 1/40* (2015.01)
  *H04B 17/13* (2015.01)

(52) U.S. Cl.
  CPC ............ *H04B 1/0475* (2013.01); *H04B 1/40* (2013.01); *H04B 17/13* (2015.01); *H04L 1/0042* (2013.01); *H04B 2001/0425* (2013.01)

(58) Field of Classification Search
  CPC ........ H04B 1/0475; H04B 17/13; H04B 1/40; H04L 1/0042
  See application file for complete search history.

(56) References Cited

U.S. PATENT DOCUMENTS

| | | | |
|---|---|---|---|
| 5,825,813 A | 10/1998 | Na | |
| 6,456,164 B1 | 9/2002 | Fan | |
| 6,463,266 B1 | 10/2002 | Shohara | |
| 6,516,184 B1 | 2/2003 | Damgaard | |
| 6,556,086 B2 | 4/2003 | Keaveney et al. | |
| 6,845,126 B2 | 1/2005 | Dent et al. | |
| 7,155,180 B2 | 12/2006 | Kim et al. | |
| 7,317,360 B2 | 1/2008 | Keaveney | |
| 7,319,724 B2 | 1/2008 | Kishi | |
| 7,362,826 B2 | 4/2008 | Willingham | |
| 7,398,056 B1 | 7/2008 | Ebert et al. | |

(Continued)

FOREIGN PATENT DOCUMENTS

WO  WO 01/20791 A1  3/2001

OTHER PUBLICATIONS

Office Action Issued for Swedish Application No. 1651512-4 dated Mar. 13, 2017, 5 pages.

*Primary Examiner* — Jaison Joseph
(74) *Attorney, Agent, or Firm* — Knobbe Martens Olson & Bear LLP

(57) ABSTRACT

Apparatus and methods for transceiver calibration are provided. In certain configurations, a transceiver includes a transmit channel and an observation channel. The transmit channel includes a transmit mixer that up-converts a transmit signal by a first or transmit local oscillator frequency. The observation channel includes an observation mixer that down-converts an observed signal from the transmit channel by a second or observation local oscillator frequency that is offset from the first local oscillator frequency. By observing the transmit channel using a local oscillator frequency that is offset relative to the transmit channel's local oscillator frequency, the observation channel can observe transmit channel impairments substantially independently from observation channel impairments.

21 Claims, 5 Drawing Sheets

(56) References Cited

U.S. PATENT DOCUMENTS

| | | |
|---|---|---|
| 7,463,710 B2 | 12/2008 | Walsh et al. |
| 7,466,785 B2 | 12/2008 | Sanduleanu et al. |
| 7,606,341 B2 | 10/2009 | Pereira |
| 7,672,364 B2 | 3/2010 | Kang et al. |
| 7,733,949 B2 | 6/2010 | Jin et al. |
| 7,734,000 B2 | 6/2010 | Kuo et al. |
| 7,804,926 B2 | 9/2010 | Sanduleanu |
| 7,826,808 B2 | 11/2010 | Faulkner |
| 7,986,745 B2 | 7/2011 | Hosaka et al. |
| 8,106,690 B2 | 1/2012 | Sakaguchi et al. |
| 8,121,233 B2 | 2/2012 | Chang et al. |
| 8,284,824 B1 | 10/2012 | Smaini et al. |
| 8,340,167 B2 | 12/2012 | Feng et al. |
| 8,358,729 B2 | 1/2013 | Bae et al. |
| 8,665,938 B2 | 3/2014 | Yu et al. |
| 8,816,724 B2 | 8/2014 | Kennedy |
| 8,897,735 B2 | 11/2014 | Kim et al. |
| 8,917,759 B2 | 12/2014 | Xu |
| 8,958,504 B2 | 2/2015 | Warke et al. |
| 8,995,517 B2 | 3/2015 | Delforce et al. |
| 9,008,161 B1 | 4/2015 | Chang et al. |
| 9,048,847 B2 | 6/2015 | McLaurin et al. |
| 9,203,448 B2 | 12/2015 | Morita et al. |
| 9,300,444 B2 | 3/2016 | Hormis et al. |
| 9,325,553 B2 | 4/2016 | Kaukovuori et al. |
| 9,385,790 B1 | 7/2016 | Mukherjee et al. |
| 2003/0151455 A1 | 8/2003 | Kawai |
| 2003/0153273 A1 | 8/2003 | Ebert et al. |
| 2003/0171110 A1 | 9/2003 | Shi et al. |
| 2003/0206603 A1 | 11/2003 | Husted |
| 2006/0034356 A1 | 2/2006 | Fechtel |
| 2006/0035601 A1 | 2/2006 | Seo |
| 2007/0077906 A1 | 4/2007 | Kirichenko |
| 2008/0008067 A1 | 1/2008 | Arisaka |
| 2009/0054007 A1 | 2/2009 | Kawabe et al. |
| 2009/0146736 A1 | 6/2009 | Kim et al. |
| 2009/0232195 A1 | 9/2009 | Ozawa |
| 2010/0087227 A1 | 4/2010 | Francos et al. |
| 2010/0150289 A1 | 6/2010 | Sunaga et al. |
| 2011/0013724 A1 | 1/2011 | Metreaud et al. |
| 2011/0292978 A1 | 12/2011 | Kravitz |
| 2012/0230176 A1 | 9/2012 | Komninakis et al. |
| 2012/0300818 A1 | 11/2012 | Metreaud et al. |
| 2013/0266045 A1 | 10/2013 | Lakkis |
| 2013/0272175 A1 | 10/2013 | Zargari et al. |
| 2014/0134943 A1 | 5/2014 | Hobbs et al. |
| 2014/0192923 A1* | 7/2014 | Matsuo ............... H01Q 3/2605 375/296 |
| 2015/0118980 A1 | 4/2015 | Leung et al. |
| 2015/0222418 A1 | 8/2015 | Akita et al. |
| 2015/0311989 A1 | 10/2015 | Richmond et al. |
| 2015/0333850 A1 | 11/2015 | Myoung et al. |
| 2016/0036451 A1 | 2/2016 | Kamali |
| 2016/0043860 A1 | 2/2016 | Tu et al. |
| 2016/0087783 A1 | 3/2016 | Lin et al. |
| 2016/0087784 A1 | 3/2016 | Lin |

* cited by examiner

__US 9,673,847 B1__

APPARATUS AND METHODS FOR TRANSCEIVER CALIBRATION

BACKGROUND

Field

Embodiments of the invention relate to electronic systems, and more particularly, to transceiver calibration.

Description of the Related Technology

A transceiver can be used in a wide variety of radio frequency (RF) communication systems. For example, transceivers can be included in mobile devices to transmit and receive signals associated with a wide variety of communications standards, including, for example, cellular and/or wireless local area network (WLAN) standards.

A transmit channel of an RF communication system can be calibrated to compensate for transmit impairments. Calibrating a transmit channel can enhance an RF communication system's performance, including, for example, by decreasing error vector magnitude (EVM) or meeting out of band emissions specifications.

SUMMARY

In one aspect, a method of transceiver calibration is provided. The method includes generating a transmit local oscillator signal of a first frequency using a transmit local oscillator, mixing a transmit signal and the transmit local oscillator signal using a transmit mixer of a transmit channel, generating an observation local oscillator signal of a second frequency different from the first frequency using an observation local oscillator, generating an observation signal from the transmit channel, mixing the observation signal and the observation local oscillator signal using an observation mixer of an observation channel, and detecting impairments of the transmit channel based on an output signal of the observation channel using a transmit error correction circuit.

In another aspect, a transceiver is provided. The transceiver includes a transmit channel including a transmit local oscillator configured to generate a transmit local oscillator signal of a first frequency and a transmit mixer configured to mix a transmit signal and the transmit local oscillator signal. The transceiver further includes an observation channel including an observation local oscillator configured to generate an observation local oscillator signal of a second frequency different from the first frequency, and an observation mixer configured to mix an observation signal generated from the transmit channel and the observation local oscillator signal. The transceiver further includes a transmit error correction circuit configured to detect impairments of the transmit channel based on an output signal of the observation channel.

DETAILED DESCRIPTION OF EMBODIMENTS

Figure 1:
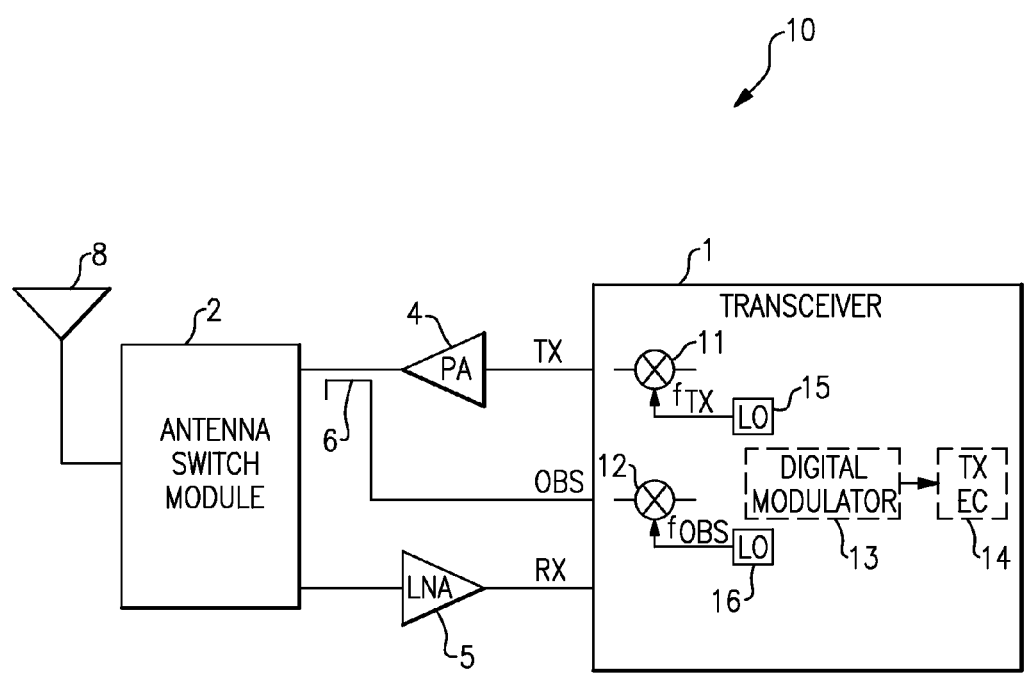
FIG. 1 is a schematic diagram of one embodiment of a radio frequency (RF) communication system.

The following detailed description of embodiments presents various descriptions of specific embodiments of the invention. However, the invention can be embodied in a multitude of different ways as defined and covered by the claims. In this description, reference is made to the drawings where like reference numerals may indicate identical or functionally similar elements.

A radio frequency (RF) communication system, such as a direct conversion quadrature radio, can suffer from a variety of impairments. Absent calibration, the impairments can lead to transmit errors and/or performance degradation.

For example, a direct conversion quadrature radio can be used to process in-phase (I) and quadrature-phase (Q) signals, which ideally have a phase separation of exactly 90°. However, one or more components of the direct conversion quadrature radio can have quadrature error. For example, a local oscillator can have a quadrature error that can be symmetric with respect to frequencies above and below the local oscillator's frequency. Moreover, mixers used for up-shifting the frequency spectrum of signals for transmission and/or mixers used for down-shifting signals for observation can likewise have quadrature error. Furthermore, delay and/or gain differences of digital-to-analog converters (DACs) used in I and Q paths can generate quadrature error.

An RF communication system can also suffer from other transmit impairments, including, for example, those associated with local oscillator leakage. Absent calibration, the transmit impairments can degrade the RF communication system's performance, including, for example, by increasing EVM and/or degrading image rejection ratio (IRR).

To calibrate a transmit channel in an RF communication system, a portion of an RF transmit signal can be looped back into an observation channel. Additionally, the observation channel can be used to measure or observe the transmit channel's impairments, and correction can be applied based on the observations. Although calibrating a transmit channel in this manner can reduce transmit impairments, a transmit channel can nevertheless still suffer from transmit impairments after such a calibration. For example, impairments arising from a transmit mixer and an observation mixer often have similar spectral characteristics, and thus it is difficult to isolate such impairments from one another. Thus, calibrating a transmit channel based on observations from an observation channel can be imperfect and may fail to correct for certain impairments.

One technique for isolating transmit mixer impairments from observation mixer impairments is to first calibrate the observation channel before calibrating the transmit channel. For example, a continuous wave (CW) tone can be injected into the observation channel and used to calibrate the observation channel's observation mixer. After compensating the observation channel, the transmit RF signal can be looped into the observation channel to detect impairments arising from the transmit mixer. Although calibrating a transmit channel in this manner can correct for transmit mixer impairments, such a calibration scheme can suffer from complexity, high power consumption, and/or long calibration times.

Apparatus and methods for transceiver calibration are provided herein. In certain configurations, a transceiver includes a transmit channel or path and an observation channel or path. The transmit channel includes a transmit mixer that up-converts a transmit signal by a first or transmit local oscillator frequency. The observation channel includes an observation mixer that down-converts an observed signal from the transmit channel by a second or observation local oscillator frequency that is offset from the first local oscillator frequency. By observing the transmit channel using a local oscillator frequency that is offset relative to the transmit channel's local oscillator frequency, the observation channel can observe transmit channel impairments substantially independently from observation channel impairments.

Thus, the transmit channel can be properly calibrated based on observations taken using an observation channel without needing to calibrate the observation channel beforehand. In contrast, an RF communication system that uses the same local oscillator frequency for up-shifting in the transmit channel and down-shifting in the observation channel may not properly calibrate transmit impairments, since impairments resulting from transmit and observation mixers are indistinguishable. For example, when using the same local oscillator frequency, both transmit local oscillator leakage and observation local oscillator leakage have identical characteristics in the frequency domain.

When the observation mixer and transmit mixer operate using different local oscillator frequencies, the observation impairments should remain symmetric in the observed signal, but the transmit impairments are no longer be symmetric. In certain implementations, the transceiver further includes a digital modulator in the data path of the observation channel. The digital modulator is used to compensate for a frequency difference between transmit and observation local oscillator frequencies. After digitally-compensating for the frequency difference using the digital modulator, the transmit channel impairments are symmetric, while the observation channel impairments are shifted such that they are asymmetric. After frequency domain conversion and correlation of the digital modulator's output, the transmit impairments should be correlated and detectable, while the observation channel impairments should tend to be non-correlated and average as noise.

In certain implementations, the digital modulator includes a numerically controlled oscillator (NCO) and a digital complex mixer. Additionally, the NCO is programmed to generate a digital output clock signal, such a digital representation of a continuous wave tone, having a frequency that is about equal to a difference between the local oscillator frequency of the transmit channel and the local oscillator frequency of the observation channel. The NCO can be implemented with sufficient precision to match the frequency difference of the local oscillators. Additionally, the NCO can be implemented to operate with an adjustable modulus, thereby increasing flexibility by allowing the NCO to provide compensation for a wide range of transmit and observation local oscillator frequencies and moduli.

When the frequency of the NCO's output clock signal is equal to the frequency difference between the transmit channel and the observation channel, a correlation to detect transmit impairments can be made over a wide range of time periods. Thus, a tradeoff between the noise floor and the calibration time of the transmit channel can be controlled by selecting the time period over which the correlation is made. For example, the noise floor can be selectively lowered by choosing the time period to be relatively long.

FIG. 1 is a schematic diagram of one embodiment of an RF communication system 10. The RF communication system 10 includes a transceiver 1, an antenna switch module (ASM) 2, a power amplifier (PA) 4, a low noise amplifier (LNA) 5, a directional coupler 6, and an antenna 8.

As shown in FIG. 1, the transceiver 1 generates a transmit signal TX, which is provided to the PA 4 for amplification. An output of the PA 4 is electrically coupled to the antenna 8 via the antenna switch module 2. In the illustrated embodiment, the directional coupler 6 generates an observation signal OBS based on sensing the PA's output. However, other configurations are possible, including, for example, implementations in which an observation signal is generated based on an output of a driver stage. An input of the LNA 5 is electrically coupled to the antenna 8 via the antenna switch module 2. The LNA 5 generates a receive signal RX for the transceiver 1 based on providing low noise amplification to signals received on the antenna 8.

Although the RF communication system 10 is illustrated as including one receive channel, one transmit channel, one observation channel, and one antenna, the teachings herein are also applicable to configurations using one or more additional receive channels, transmit channels, observation channels, and/or antennas. Moreover, the teachings herein are applicable to configurations in which the receive channel, transmit channel, and/or observation channel are implemented in other ways. For example, in another embodiment, an observation channel is implemented internally to a transmitter, such as by using an on-chip feedback path.

As shown in FIG. 1, the transceiver 1 includes a transmit mixer 11, which is used to generate the transmit signal TX based on providing modulation using a first or transmit local oscillator frequency $f_{TX}$ from a transmit local oscillator 15. Additionally, the transceiver 1 further includes an observation mixer 12, which is used to down-shift the frequency spectrum of the observation signal OBS based on providing modulation using a second or observation local oscillator frequency $f_{OBS}$ from an observation local oscillator 16.

The observation local oscillator frequency $f_{OBS}$ is offset from the transmit local oscillator frequency $f_{TX}$ such that transmit channel and observation channel operate with a frequency difference. By operating the transmit mixer 11 and the observation mixer 12 at different local oscillator frequencies, the observation channel can observe the transmit channel impairments substantially independently from the observation channel impairments.

For example, observing the transmit channel in this manner can result in the leakage of the transmit local oscillator 15 and the leakage of the observation local oscillator 16 being separated in frequency in the observation channel's output. Moreover, performing observations at different local oscillator frequencies can also result in quadrature errors of the transmit and observation channels having different spectral characteristics at the observation channel's output. Thus, the observation channel can be used to calibrate the transmit channel without needing to calibrate the observation channel before performing the observations.

In contrast, an RF communication system that uses the same local oscillator frequency for a transmit mixer and an observation mixer may not properly calibrate transmit impairments without pre-calibration of the observation channel for quadrature error. For example, impairments arising from the transmit mixer and observation mixer can have similar spectral characteristics to one another, and it may not be possible to isolate such impairments from one another when the transmit mixer and observation mixer are operating at the same local oscillator frequency.

Thus, the illustrated observation channel is used to provide observations of the transmit channel at an offset frequency. Configuring the RF communication system 10 in this manner advantageously provide calibration with higher accuracy, lower power consumption, and/or reduced complexity.

In one embodiment, a frequency difference between the transmit local oscillator frequency $f_{TX}$ and the observation local oscillator frequency $f_{OBS}$ is selected to be at least about 100 KHz. However, other frequency differences are possible, such as a frequency difference selected based on application and/or implementation.

For example, a frequency difference can be selected based on the bandwidth of the transmit and observation channels. For instance, the frequency difference can be selected such that after an observation signal is down-shifted by the observation local oscillator frequency, the observed impairments are within the observation channel's bandwidth. As persons of ordinary skill in the art will appreciate, relative large frequency differences can decrease frequency spurs, but smaller frequency differences can have superior power and/or bandwidth performance. In certain implementations, the transmit local oscillator frequency $f_{TX}$ is selected to be greater than the observation local oscillator frequency $f_{OBS}$, while in other implementations the transmit local oscillator frequency $f_{TX}$ is selected to be less than the observation local oscillator frequency $f_{OBS}$.

Although the illustrated observation channel is described as being used for calibrating impairments of a transmit channel, the observation channel can also be used for additional functions. Additional observations can be performed using either offset local oscillator frequencies or the same local oscillator frequencies. Configuring an observation channel to perform multiple functions facilitates the sharing of hardware resources, thereby reducing cost, size, and/or complexity.

In one embodiment, the observation signal OBS and the receive signal RX are processed using a shared or common receive circuit of the transceiver 1. Configuring the transceiver 1 in this manner can reduce size and/or cost of the RF communication system 10.

The illustrated transceiver 1 also includes the digital modulator 13, which operates in a data path of the observation channel. In certain implementations, the digital modulator 13 is used to modulate a digital representation of the output of the observation mixer 12 after it is converted from the analog domain to the digital domain and/or further processed.

The digital modulator 13 is used to compensate for a frequency difference between the transmit local oscillator frequency $f_{TX}$ and the observation local oscillator frequency $f_{OBS}$. When the observation mixer and transmit mixer operate using different local oscillator frequencies, the observation impairments should remain symmetric in the observed signal, but the transmit impairments may no longer be symmetric. After digitally-compensating for the frequency difference using the digital modulator 13, the transmit channel impairments should be symmetric, while the observation channel impairments should be shifted such that they are asymmetric.

The illustrated transceiver 1 includes a transmit error correction circuit 14, which is used to process the output of the digital modulator 13 to detect and correct transmit impairments. In certain implementations, the transmit error correction circuit 14 detects transmit impairments based on correlating the observation channel's output for a length of time. The transmit error correction circuit 14 can be used to correct for a wide variety of transmit impairments, including, for example, quadrature errors, local oscillator leakage, and/or channel non-linearity.

In certain configurations, the transceiver 1 operates with digital predistortion (DPD) to aid in linearizing the PA 4 for different input power levels, and the observation channel performs DPD observations with an offset local oscillator frequency relative to the transmit channel. DPD can be used to compensate for nonlinear effects of the PA, including, for example, signal constellation distortion and/or signal spectrum spreading. A signal transmitted by the transceiver 1 can have an occupy bandwidth, and the transceiver 1 can transmit over a synthesis bandwidth that is greater than the occupy bandwidth. By configuring the transceiver 1 in this manner, the transceiver 1 can pre-distort the transmitted signal to compensate for out-of-band transmissions and other non-linear effects.

In one embodiment, the observation channel is used to perform observations over an observation bandwidth that is greater than both the synthesis bandwidth and occupy bandwidth. Additionally, to reduce the observation channel's power consumption and complexity, the observation channel is implemented with a bandwidth that is less than the full observation bandwidth. The frequency difference between the transmit local oscillator frequency and the observation local observation frequency changed over time to observe different portions of the observation bandwidth at different time instances. In such configurations, the transmit error correction circuit 14 can reconstruct the full observation bandwidth based on the observations performed for each local oscillator offset or frequency difference. Thus, the transceiver achieves the benefits of DPD using a low bandwidth observation channel having lower power consumption and/or reduced complexity.

Additional details of the RF communication system 10 can be as described earlier.

Figure 2:
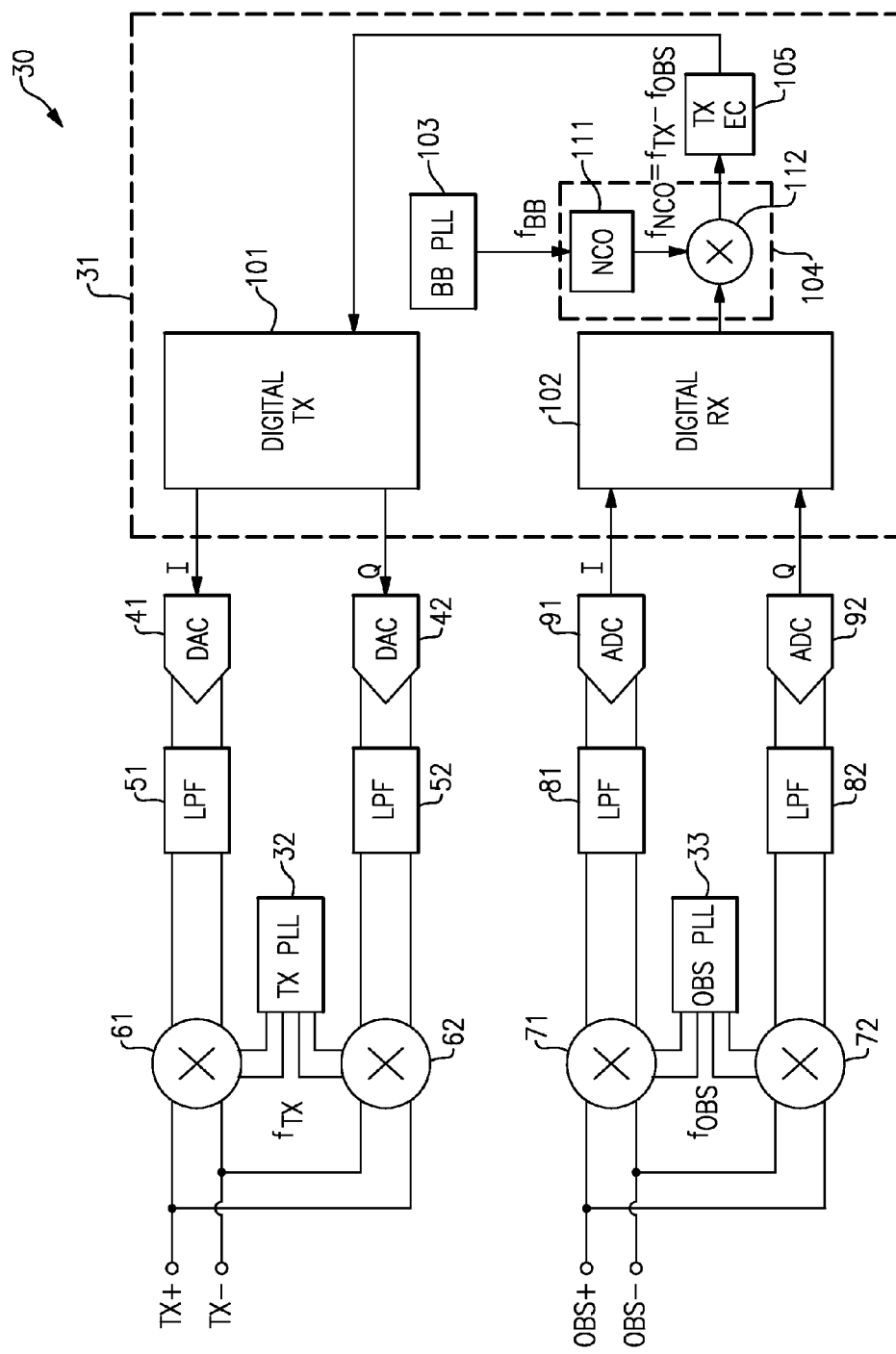
FIG. 2 is a schematic diagram of one embodiment of a transceiver.

FIG. 2 is a schematic diagram of one embodiment of a transceiver 30. The transceiver 30 includes a baseband processing circuit 31, a transmit phase-locked loop (PLL) 32, an observation PLL 33, a transmit in-phase digital-to-analog converter (DAC) 41, a transmit quadrature-phase DAC 42, a transmit in-phase low pass filter (LPF) 51, a transmit quadrature-phase LPF 52, a transmit in-phase mixer 61, a transmit quadrature-phase mixer 62, an observation in-phase mixer 71, an observation quadrature-phase mixer 72, an observation in-phase LPF 81, an observation quadrature-phase LPF 82, an observation in-phase analog-to-digital converter (ADC) 91, and an observation quadrature-phase ADC 92.

As shown in FIG. 2, the transceiver 30 generates a differential transmit signal TX+, TX− corresponding to a difference between a non-inverted transmit signal TX+ and an inverted transmit signal TX−. Additionally, the transceiver 30 receives a differential observation signal OBS+, OBS− corresponding to a difference between a non-inverted observation signal OBS+ and an inverted observation signal OBS−. The differential observation signal OBS+, OBS− is generated based on observing the transmit channel, such as by observing an output of a power amplifier that amplifies the differential transmit signal TX+, TX−. Although a configuration using differential signaling is shown, the teachings herein are also applicable to single-ended configurations and/or configurations using a combination of single-ended and differential signaling.

Although the transceiver 30 is illustrated as including one transmit channel or path and one observation channel or path, the transceiver 30 can also include additional circuitry, including, for example, one or more receive channels, one or more additional transmit channels, and/or one or more additional observation channels. Such details are omitted from FIG. 2 for clarity of the figures. Moreover, although the transceiver 30 illustrates a specific implementation of a transmit channel, observation channel, and baseband processing circuit, the teachings herein are applicable other configurations.

The transmit in-phase DAC 41 receives a digital transmit I signal from the baseband processing circuit 31, and generates a differential analog transmit I signal for the transmit in-phase LPF 51. The transmit in-phase LPF 51 filters the differential analog transmit I signal to generate a differential filtered transmit I signal, which is provided as an input to the transmit in-phase mixer 61. The transmit quadrature-phase DAC 42 receives a digital transmit Q signal from the baseband processing circuit 31, and generates a differential analog transmit Q signal for the transmit quadrature-phase LPF 52. The transmit quadrature-phase LPF 52 filters the differential analog transmit Q signal to generate a differential filtered transmit Q signal, which is provided as an input to the transmit quadrature-phase mixer 62. The non-inverted transmit signal TX+ is generated based on combining a first output of the transmit in-phase mixer 61 and a first output of the transmit quadrature-phase mixer 62, and the inverted transmit signal TX− is generated based on combining a second output of the transmit in-phase mixer 61 and a second output of the transmit quadrature-phase mixer 62.

The transmit PLL 32 generates a first differential transmit local oscillator signal for the transmit in-phase mixer 61 and a second differential transmit local oscillator signal for the transmit quadrature-phase mixer 62. The first and second differential transmit local oscillator signals each have a first or transmit local oscillator frequency $f_{TX}$, but a phase difference of about 90°.

The observation PLL 33 generates a first differential observation local oscillator signal for the observation in-phase mixer 71 and a second differential observation local oscillator signal for the observation quadrature-phase mixer 72. The first and second differential observation local oscillator signals each have a second or observation local oscillator frequency $f_{OBS}$, but a phase difference of about 90°. When observing the output of the transmit channel during calibration, the observation local oscillator frequency $f_{OBS}$ and the transmit local oscillator frequency $f_{TX}$ operate at different frequencies.

The observation in-phase mixer 71 receives the differential observation signal OBS+, OBS− and the first differential observation local oscillator signal, and generates a differential down-shifted I signal for the observation in-phase LPF 81. The observation in-phase LPF 81 filters the differential down-shifted I signal to generate a differential filtered observation I signal, which is provided as an input to the observation in-phase ADC 91. The observation in-phase ADC 91 converts the differential filtered observation I signal from the analog domain to the digital domain to generate a digital observation I signal for the baseband processing circuit 31. The observation quadrature-phase mixer 72 receives the differential observation signal OBS+, OBS− and the second differential observation local oscillator signal, and generates a differential down-shifted Q signal for the observation quadrature-phase LPF 82. The observation quadrature-phase LPF 82 filters the differential down-shifted Q signal to generate a differential filtered observation Q signal, which is provided as an input to the observation quadrature-phase ADC 92. The observation quadrature-phase ADC 92 converts the differential filtered observation Q signal from the analog domain to the digital domain to generate a digital observation Q signal for the baseband processing circuit 31.

In the illustrated embodiment, transmit and observation local oscillators have been implemented using the transmit PLL 32 and the observation PLL 33, respectively. Implementing the local oscillators of the transmit and observation channels using PLLs aids in generating local oscillator signals of different frequencies using a common reference clock signal. The PLLs can be implemented using similar circuit topologies, such that the observation local oscillator frequency $f_{OBS}$ has a well-controlled frequency difference relative to the transmit local oscillator frequency $f_{TX}$. For instance, the frequency difference between the observation local oscillator frequency $f_{OBS}$ and the transmit local oscillator frequency $f_{TX}$ can be controlled based on selecting values of digital control signals used to control feedback dividers of the PLLs.

As shown in FIG. 2, the baseband processing circuit 31 includes a digital transmit circuit 101, a digital receive circuit 102, a baseband PLL 103, a digital modulator 104, and a transmit error correction circuit 105. In the illustrated embodiment, the digital modulator 104 includes a numerically controlled oscillator (NCO) 111 and a complex mixer 112.

The digital receive circuit 102 receives the digital observation I signal and the digital observation Q signal, and generates a digital input signal for the digital modulator 104. The digital modulator also receives a baseband clock signal having a baseband frequency $f_{BB}$ from the baseband PLL 103. In one embodiment, the digital receive circuit 102 is also used to process both observation signals used for observing a transmit channel and received signals received over a receive channel.

The NCO 111 receives the baseband clock signal and generates a digital output clock signal having an NCO frequency $f_{NCO}$ that is about equal to a frequency difference between the transmit local oscillator frequency $f_{TX}$ and the observation local oscillator frequency $f_{OBS}$. The digital output clock signal can be implemented in a wide variety of ways. In certain configurations, the digital output clock signal includes a first component corresponding to a digital representation of a sine function of frequency $f_{NCO}$ and a second component corresponding to a digital representation of a cosine function of frequency $f_{NCO}$. The digital output clock signal can have a wide variety of bit widths. In one embodiment, the NCO 111 is implemented using a phase accumulator and a phase-to-amplitude converter.

The digital complex mixer 112 generates a digital observation channel output signal for the transmit error correction circuit 105 based on modulating the digital input signal from the digital receive circuit 102 with the digital output clock signal from the NCO 111. In certain implementations, the digital complex mixer 112 receives a digital input I signal and a digital input Q signal from the digital receive circuit 102, and generates a digital observation channel output I signal and a digital observation output Q signal for the transmit error correction circuit 105.

In one embodiment, the baseband PLL 103, the transmit PLL 32, and the observation PLL 33 operate using a common reference clock signal. Configuring the transceiver 30 in this manner can aid in matching the NCO frequency $f_{NCO}$ to the frequency difference between the transmit local oscillator frequency $f_{TX}$ and the observation local oscillator frequency $f_{OBS}$.

The transmit error correction circuit 105 processes the observational channel output signal to generate one or more correction signals for the transceiver 30. In the illustrated embodiment, the transmit error correction circuit 105 provides a correction signal to the digital transmit circuit 101. However, a transmit error correction circuit can be configured to compensate for transmit impairments in other ways. The digital transmit circuit 101 generates the digital transmit I signal and the digital transmit Q signal based on the correction signal to compensate for transmit impairments, such as leakage, quadrature errors, and/or channel non-linearity.

The illustrated transceiver 30 can provide transmit channel calibration without need to calibrate the observation channel beforehand for quadrature error. In particular, by performing observations using a different observation local oscillator frequency $f_{OBS}$ relative to the transmit local oscillator frequency $f_{TX}$, the transmit error correction circuit 105 can detect and correct transmit impairments, even in the presence of impairments in the observation channel. For example, the digital observation channel output signal generated by the digital modulator 104 can have a frequency spectrum in which transmit channel impairments are symmetric around the center of the band, and in which observation channel impairments are asymmetric around the center of the band. Thus, the transmit error correction circuit 105 can correlate the digital observation channel output signal to detect transmit impairments, while the observation channel impairments should tend to be non-correlated and average as noise.

In contrast, a transceiver that performs observation using a common transmit and observation local oscillator frequencies, may not be able to differentiate between impairments of the transmit channel and impairments of the observation channel. For example, when using the same local oscillator frequency, both transmit local oscillator leakage and observation local oscillator leakage can have similar characteristics in the frequency domain and therefore sum together and are individually indistinguishable.

In the illustrated embodiment, the NCO 111 is programmed to generate a digital output clock signal having an NCO frequency $f_{NCO}$ that is about equal to a difference between the transmit local oscillator frequency $f_{TX}$ and the observation local oscillator frequency $f_{OBS}$. When the NCO 111 generates the digital output clock signal in this manner, the transmit error correction circuit 105 can perform a correlation to detect transmit impairments over a wide range of time periods, including, for example, a relatively long time period to provide a low noise floor. In contrast, when the NCO frequency $f_{NCO}$ does not match the frequency difference, a phase relationship between positive and negative frequency components of a given impairment can slowly rotate, and long correlations can tend to average to zero rather than accumulate.

Additional details of the transceiver 30 can be as described earlier.

Figure 3:
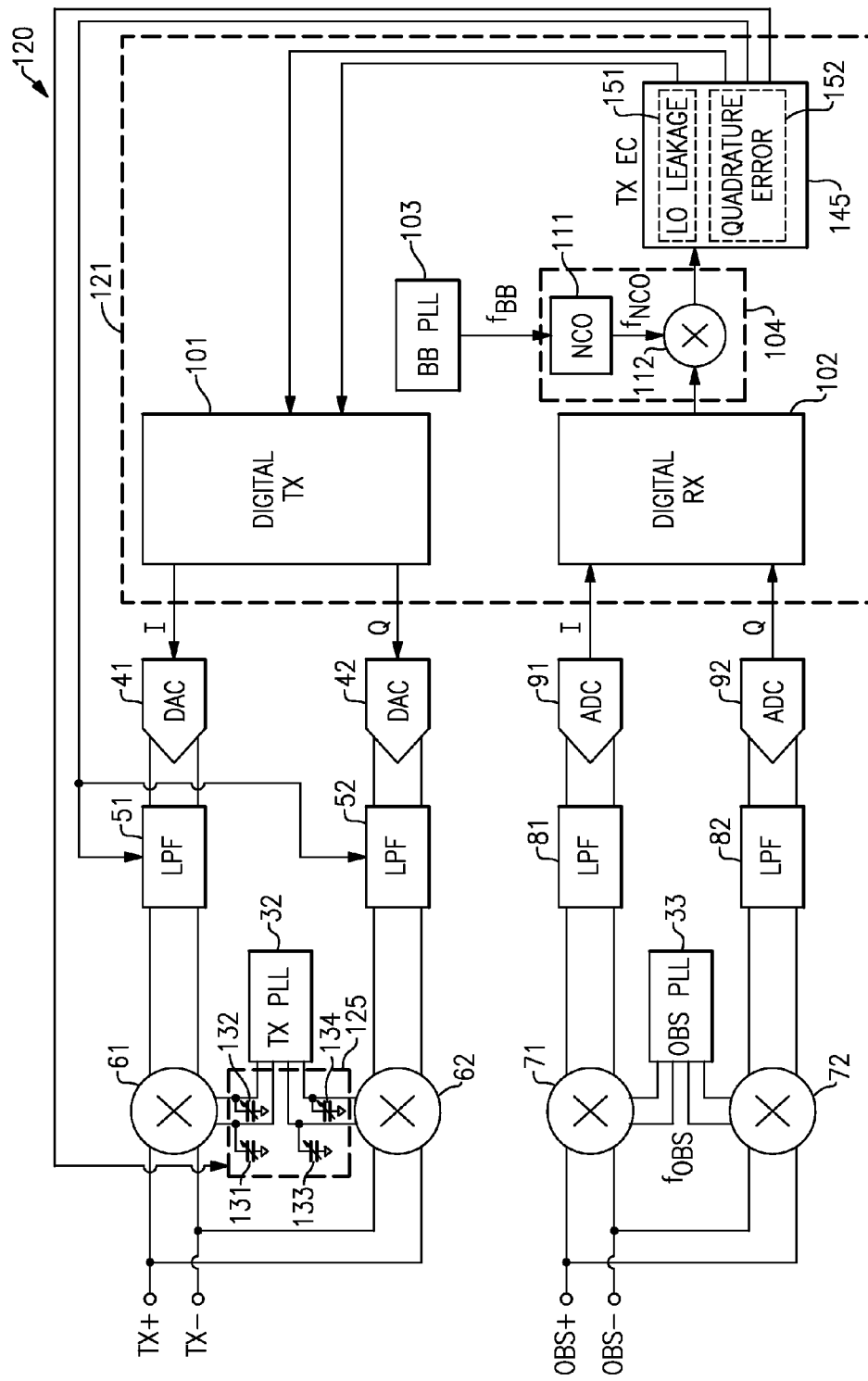
FIG. 3 is a schematic diagram of another embodiment of a transceiver.

FIG. 3 is a schematic diagram of another embodiment of a transceiver 120. The transceiver 120 of FIG. 3 is similar to the transceiver 30 of FIG. 2, except that the transceiver 120 further includes a variable capacitor array 125 and is implemented using a different configuration of a baseband processing circuit 121.

In particular, the illustrated baseband processing circuit 121 includes a transmit error correction circuit 145 that includes a local oscillator (LO) leakage correction circuit 151 and a quadrature error correction circuit 152. The transmit error correction circuit 145 processes the digital observation channel output signal from the digital modulator 104 to generate multiple correction signals for compensating for transmit impairments.

In the illustrated embodiment, the LO leakage correction circuit 151 generates a LO leakage correction signal that is provided to the digital transmit circuit 101. The digital transmit circuit 101 uses the LO leakage correction signal to control a DC offset of the baseband transmit signal represented by the digital transmit I and Q signals. For example, coupling of the transmit PLL 32 or other transmit local oscillator can undesirably generate at tone in the differential transmit signal TX+, TX− at the transmit local oscillator frequency $f_{TX}$. By applying a DC offset in the baseband processing circuit 121, the tone at the transmit local oscillator frequency $f_{TX}$ can be compensated, since a DC frequency component of the baseband transmit signal is up-shifted to the transmit local oscillator frequency $f_{TX}$ by modulation of the transmit mixers 61, 62.

As shown in FIG. 3, the quadrature error correction circuit 152 generates a first quadrature error correction signal for the digital transmit circuit 101. The digital transmit circuit 101 can use the first quadrature error correction signal to match or balance a gain of the transmit Q-path and the transmit I-path, thereby reducing quadrature error. In one embodiment, the first quadrature error correction signal is used to adjust an amplitude of at least one of the digital transmit I signal or the digital transmit Q signal to balance the transmit Q-path and the transmit I-path.

The illustrated quadrature error correction circuit 152 further generates a second quadrature error correction signal used to control a group delay of at least one of the transmit in-phase LPF 51 or the transmit quadrature-phase LPF 52. In certain implementations, the second quadrature error correction signal controls group delay to reduce or eliminate a phase difference between a transmit Q-path and a transmit I-path, thereby compensating for quadrature error.

The quadrature error correction circuit 152 also generates a third quadrature error correction signal used to control a phase difference between clock signals generated by the transmit PLL 32. In particular, the third quadrature error correction signal is used to control capacitance values of the variable capacitor array 125, which includes a first variable capacitor 131, a second variable capacitor 132, a third variable capacitor 133, and a fourth variable capacitor 134. As used herein, a variable capacitor refers to any capacitor having a controllable capacitor value, such as digitally-controlled capacitors (for example, a programmable capacitor bank), analog-tuned capacitors (for example, varactors), or a combination thereof.

As shown in FIG. 3, the transmit PLL 32 includes a first non-inverted output and a first inverted output used to generate a first differential transmit local oscillator signal for the transmit in-phase mixer 61. Additionally, the transmit PLL 32 further includes a second non-inverted output and a second inverted output that generates a second differential transmit local oscillator signal for the transmit quadrature-phase mixer 62. The first and second variable capacitors 131, 132 are electrically connected to the first non-inverted output and the first inverted output, respectively, of the transmit PLL 32. Additionally, the third and fourth variable capacitors 133, 134 are electrically connected to the second non-inverted output and the second inverted output, respectively, of the transmit PLL 32.

As shown in FIG. 3, the third quadrature error correction signal can be used to control the capacitance value of the first variable capacitor 131, the second variable capacitor 132, the third variable capacitor 133, and/or the fourth variable capacitor 134. Thus, the third quadrature error correction signal can be used to control a delay of the first differential transmit local oscillator signal relative to the second differential transmit local oscillator signal, thereby controlling timing of mixing operations of the transmit in-phase mixer 61 relative to the transmit quadrature-phase mixer 62. The third quadrature error correction signal can also be used to control timing of a non-inverted local oscillator signal component relative to an inverted local oscillator signal component to compensate for errors in the first and/or differential transmit local oscillator signals.

Although FIG. 3 illustrates an embodiment in which the clock signals generated by the transmit PLL 32 are differential, the teachings herein are also applicable to configurations in which a local oscillator generates single-ended clock signals. In such configurations, one or more variable capacitors can be used to control timing of the single-ended clock signals relative to one another, thereby controlling a time difference between mixing operations of a transmit in-phase mixer relative to a transmit quadrature-phase mixer.

In one embodiment, the transmit error correction circuit 145 detects transmit impairments by using a time-domain auto-correlation and cross-correlation circuit. The auto-correlate function correlates the complex (I/Q) transmit signal with itself. The cross-correlate function correlates the complex transmit signal against the complex observation signal. The correlations can be summed for a programmable number of cycles, and the results of accumulation can be used to solve a system of equations modelling the impairments.

Additional details of the transceiver 120 can be as described earlier.

Figure 4A:
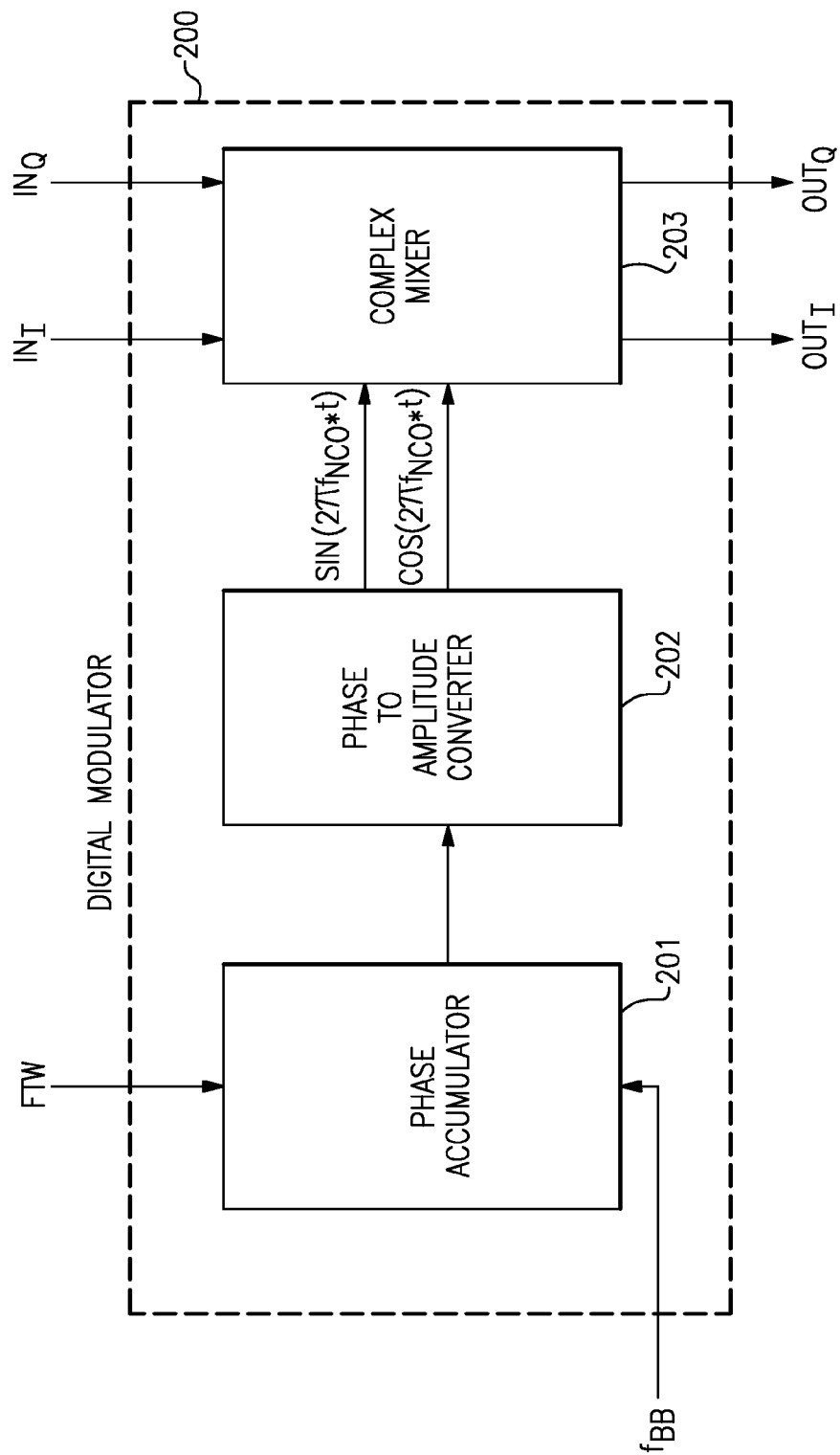
FIG. 4A is a schematic diagram of one embodiment of a digital modulator.

FIG. 4A is a schematic diagram of one embodiment of a digital modulator 200. The digital modulator 200 includes a phase accumulator 201, a phase-to-amplitude converter (PAC) 202, and a digital complex mixer 203. The digital modulator 200 receives a baseband clock signal of frequency $f_{BB}$, a frequency tuning word (FTW), a digital input I signal $IN_I$, and a digital input Q signal $IN_Q$. The digital modulator 200 generates a digital observation channel output I signal $OUT_I$ and a digital observation channel output Q signal $OUT_Q$, which can be provided to a transmit error correction circuit for processing.

The digital modulator 200 illustrates one embodiment of a digital modulator that can be used in the RF communication systems and transceivers described herein. However, the teachings herein are applicable to other configurations of digital modulators.

The illustrated phase accumulator 201 and PAC 202 collectively operate as an Numerically Controlled Oscillator (NCO) that generates digital sine and cosine clock signals of an NCO frequency $f_{NCO}$. Additionally, a value of the FTW is used to control the NCO frequency $f_{NCO}$.

For example, the phase accumulator 201 includes state elements, such as latches and/or flip-flops, used to store an accumulated phase value. Additionally, the phase accumulator 201 can add the FTW to the accumulated phase value based on timing of the baseband clock signal. Additionally, the PAC 202 generates the digital sine and cosine clock signals based on the accumulated phase value. The FTW controls the rate at which phase is accumulated, and thus the NCO frequency $f_{NCO}$.

Additional details of the digital modulator 200 can be as described earlier.

Figure 4B:
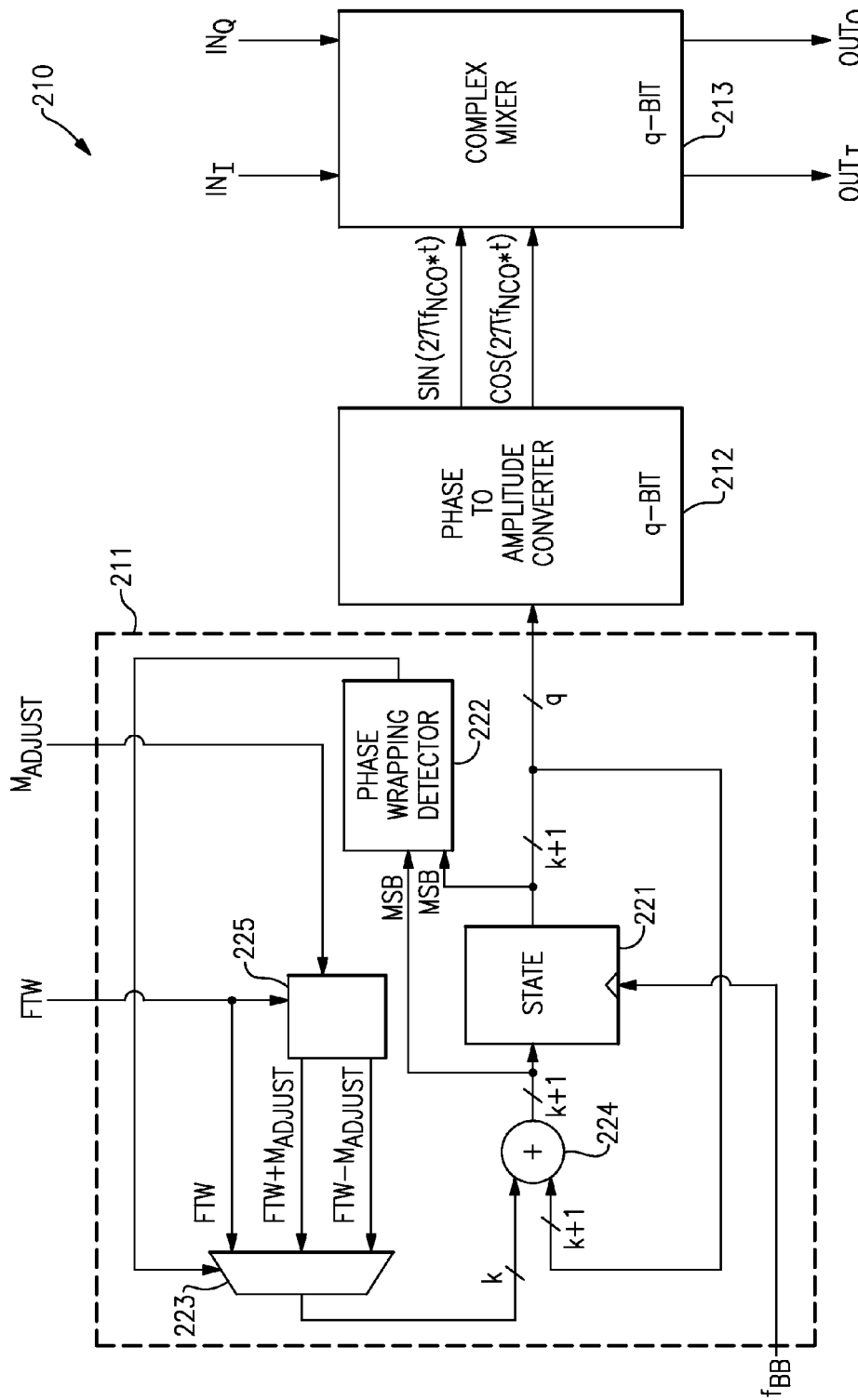
FIG. 4B is a schematic diagram of another embodiment of a digital modulator.

FIG. 4B is a schematic diagram of another embodiment of a digital modulator 210. The digital modulator 210 includes a phase accumulator 211, a q-bit PAC 212, and a q-bit digital complex mixer 213. Although FIG. 4B illustrates a configuration in which both the PAC and digital complex mixer have q-bits, other implementations are possible, such as configurations in which the PAC and digital complex mixer operate using a different number of bits as one another. The digital modulator 210 receives an adjusted modulus $M_{ADJUST}$, the baseband clock signal, the FTW, the digital input I signal $IN_I$, and the digital input Q signal $IN_Q$. Additionally, the digital modulator 210 generates the digital observation channel output I signal $OUT_I$ and the digital observation channel output Q signal $OUT_Q$.

The illustrated digital modulator 211 includes state elements 221, a phase wrapping detector 222, a multiplexer 223, an adder 224, and a FTW adjustment calculator 225. The state elements 221 are used to store a k+1 bit accumulated phase value, which is updated based on timing of the baseband clock signal. The phase wrapping detector 222 compares a most significant bit (MSB) of the accumulated phase value on successive cycles of the baseband clock signal, and controls selection of the multiplexer 223 based on the comparison. The FTW adjustment calculator 225 receives the FTW and the adjusted modulus $M_{ADJUST}$, and generates a first adjusted FTW having a value of about FTW+$M_{ADJUST}$ and a second adjusted FTW having a value of about FTW−$M_{ADJUST}$. In certain implementations the FTW has a width of k bits.

The adder 224 generates an adjusted accumulated phase value based on adding the accumulated phase value stored in the state elements 221 and an output of the multiplexer 223. The adjusted accumulated phase value is loaded into the state elements 221 based on timing of the baseband clock signal, such as once per clock cycle. As shown in FIG. 4B, the multiplexer 223 selectively outputs FTW, FTW+$M_{ADJUST}$, or FTW−$M_{ADJUST}$ based on whether or not the phase wrapping detector 220 has detected that the phase has wrapped. In certain configurations, the multiplexer 223 outputs the FTW when the phase has not wrapped, outputs FTW+$M_{ADJUST}$ when the phase has wrapped from $2\pi$ to 0 radians, and outputs FTW−$M_{ADJUST}$ when the phase has wrapped from 0 to $2\pi$ radians.

As described earlier, a transmit channel can be calibrated based on observing a transmit channel using an observation channel that operates with an observation local oscillator frequency $f_{OBS}$ that is different than a transmit local oscillator frequency $f_{TX}$. The illustrated digital modulator 210 can be used to compensate for this frequency difference by controlling the NCO frequency $f_{NCO}$ to be equal to $f_{TX}-f_{OBS}$.

As will be described in detail below, k and q can be selected to provide sufficient precision for the digital modulator 210 to accurately track the local oscillators of the transmit and observation channels. Additionally, the digital modulator 210 receives the adjusted modulus $M_{ADJUST}$, which can be used to increase the flexibility of the digital modulator 210 and allow the digital modulator 210 to provide compensation for a wide range of transmit and observation local oscillator frequencies.

In certain configurations, a transmit local oscillator of a transmit channel is implemented using a transmit PLL. For example, the frequency of the transmit PLL can be given by Equation 1 below, where $f_{ref}$ is the frequency of a reference clock signal, $N_{TX}$ is an integer portion of the transmit PLL's division rate, $F_{TX}$ is a fractional portion of the transmit PLL's division rate, M is the modulus of the transmit PLL, and $\frac{1}{2}^{TXDIV}$ is an amount of frequency division provided by an output divider of the transmit PLL. As persons of ordinary skill in the art will appreciate, this PLL architecture can be referred to as a "Frac-N PLL."

$$f_{TX} = f_{ref} * \left(N_{TX} + \frac{F_{TX}}{M}\right)\left(\frac{1}{2^{TXDIV}}\right) \qquad \text{Equation 1}$$

In certain configurations, an observation local oscillator of an observation channel is implemented using an observation PLL. For example, the frequency of the observation PLL can be given by Equation 2 below, where $f_{ref}$ is the frequency of the reference clock signal, $N_{OBS}$ is an integer portion of the observation PLL's division rate, $F_{OBS}$ is a fractional portion of the observation PLL's division rate, M is the modulus of the observation PLL, and $\frac{1}{2}^{OBSDIV}$ is an amount of frequency division provided by an output divider of the observation PLL.

$$f_{OBS} = f_{ref} * \left(N_{OBS} + \frac{F_{OBS}}{M}\right)\left(\frac{1}{2^{OBSDIV}}\right) \quad \text{Equation 2}$$

As persons having ordinary skill in the art will appreciate, the modulus M can have a variety of values, such as an integer slightly less than a power of 2. For example, M can be selected to slightly less than $2^a$–b, where a is in the range of about 8 to 64 and b is selected to be greater than 0 and less than about 5% of $2^a$. Using a modulus that is not a power of 2, or better even prime, can reduce or eliminate spurious emissions.

In certain implantations, the transmit PLL and the observation PLL operate using reference clock signals of the same frequency $f_{ref}$, and use a common value of the modulus M. Additionally, $\frac{1}{2}^{TXDIV}$ and $\frac{1}{2}^{OBSDIV}$ can be selected to be equal, and a difference in frequency between the transmit local oscillator frequency $f_{TX}$ and the observation local oscillator frequency $f_{OBS}$ can be controlled by selecting values of $N_{TX}$, $N_{OBS}$, and $F_{OBS}$.

Although a desired frequency difference between the transmit PLL and observation PLL can be obtained in this manner, it can be difficult to implement a digital modulator to precisely match the frequency difference between the transmit and observation PLLs. When the frequency difference is accurately matched, then a correlation to detect transmit impairments can be made over an arbitrary time period, which allows the noise floor to be lowered by selecting the time period to be relatively long. However, when the frequency difference is not accurately matched, a phase relationship between positive and negative components of a given impairment will slowly rotate, and long correlations will tend to average to zero rather than accumulate.

The illustrated digital modulator 210 operates using the adjusted modulus $M_{ADJUST}$, which aids in matching the frequency difference between the transmit PLL and observation PLL. As will be described further below, the adjusted modulus $M_{ADJUST}$ can be used to control the digital modulator's modulus to a value of M by setting $M_{ADJUST}$ to be about equal to $2^k$–M. Implementing the digital modulator 210 to operate using the adjusted modulus $M_{ADJUST}$ increases flexibility and increases a number of integer solutions of FTW for controlling $f_{NCO}$ to be about equal to $f_{TX}$–$f_{OBS}$.

The illustrated phase accumulator 211 represents $2\pi$ radians as $2^k$. The phase accumulator 211 further includes an addition bit, which aids in detecting phase wrapping transitions. The output of the phase accumulator 211 is a digital representation of the time varying phase of frequency $f_{NCO}$.

The PAC 212 receives the digital phase generated by the digital phase accumulator 212, and calculates sine and cosine functions to generate a unity gain complex vector. As shown in FIG. 4B, the sine function is represented as $\sin(2\pi f_{NCO}*t)$ and the cosine function is represented as $\cos(2\pi f_{NCO}*t)$. Although not illustrated, the sine and cosine functions can be scaled to maintain unity gain. The sine and cosine functions generated by the PAC 212 can be represented mathematically as $e^{j2\pi f_{NCO}*t}$, where e is a mathematical constant (Euler's number) and j is the imaginary unit.

Thus, the output of the PAC 212 corresponds to a continuous wave (CW) tone of frequency $f_{NCO}$.

The digital complex mixer 213 modulates the digital input I signal $IN_I$ and the digital input Q signal $IN_Q$ with the continuous wave tone generated by the PAC 212. The operation of the complex mixer 213 is mathematically equivalent to a compensating frequency shift of frequency $f_{NCO}$.

In certain implementations, the transmit PLL and baseband PLL are each implemented using a Frac-N sigma-delta modulator, and k is selected to be greater than or equal to a width of a fractional word accumulator in the first stage of the sigma delta modulator. Configuring the phase accumulator 211 in this manner can aid in tracking the transmit and observation PLLs precisely.

In the illustrated embodiment, the PAC 212 operates with q bits of accuracy for computations. Thus, the PAC 212 receives q bits of the accumulated phase value from the phase accumulator 211, and generates a continuous wave (sine and cosine) output of q bits. In the illustrated embodiment, q can be selected to be less than or equal to k. In certain implementations, the q bits received by the PAC 212 correspond to a range of most significant bits of the accumulated phase value beginning with bit k and ending with the bit k-q. In one example, k is 23 bits and q is 16 bits.

To provide accurate matching to the transmit and observation PLLs, it is desirable for the phase accumulator to operate using the same modulus M as the PLLs. To implement the phase accumulator 210 with modulus M, the phase accumulator 210 can operate using an adjusted modulus $M_{ADJUST}$ given by Equation 3 below.

$$M_{ADJUST} = 2^k - M \quad \text{Equation 3}$$

When the phase accumulator 211 wraps from $2\pi$ to 0, the adjusted modulus $M_{ADJUST}$ can be added on the next cycle of the phase accumulator 211, thereby adjusting the value stored in the phase accumulator 211 with the adjusted modulus $M_{ADJUST}$. Computationally, this can be done efficiently by comparing the MSB bit of the phase accumulator 211 with the previous state. In one example, when the state transitions from a 1 to a 0, the phase accumulator 211 has wrapped from $2\pi$ to 0, and FTW+$M_{ADJUST}$ can be added into the phase accumulator 211 instead of just FTW. Similarly, when the state of the MSB of the phase accumulator 211 transitions from 0 to 1, then the phase accumulator 211 has wrapped from 0 to $2\pi$, and the FTW–$M_{ADJUST}$ can be added into the phase accumulator 211.

In the illustrated configuration, the phase accumulator 211 adds FTW to the accumulated phase on each cycle of a baseband clock signal of frequency $f_{BB}$, and operates with a modulus given by Equation 3 above. Accordingly, the NCO frequency $f_{NCO}$ can be given by Equation 4 below:

$$f_{NCO} = f_{BB} * \left(\frac{FTW}{2^k - M_{ADJUST}}\right) \quad \text{Equation 4}$$

By adjusting the value stored in the phase accumulator 211 at phase origin crossings in this manner, the accuracy $\Phi$ of the phase accumulator 211 in radians is given by Equation 5 below.

$$\Phi = \frac{2\pi * (2^k - M)}{2^k} \quad \text{Equation 5}$$

For small values of the adjusted modulus $M_{ADJUST}$, the accuracy Φ is relatively high. For instance, an RF communication system operating with a value of 15 for the adjusted modulus $M_{ADJUST}$ and a phase accumulator width (k) of 23 can have a phase accuracy of about 0.00065 degrees.

In certain configurations, the baseband PLL that generates the baseband clock signal is implemented as an integer PLL. In such a configuration, the baseband PLL's output frequency $f_{BB}$ can be given by Equation 6 below.

$$f_{BB} = f_{ref} * N_{BB} \qquad \text{Equation 6}$$

In Equation 6, $f_{ref}$ is the frequency of a reference clock signal, and $N_{BB}$ is the value of the baseband PLL's integer divider.

The digital modulator 210 includes an NCO that is programmed to a frequency difference between the transmit PLL's output frequency $f_{TX}$ and the observation PLL's output frequency $f_{OBS}$. When the NCO frequency $f_{NCO}$ is set to the difference between the transmit PLL's output frequency $f_{TX}$ and the observation PLL's output frequency $f_{OBS}$, we have the relationships shown in Equation 7 below.

$$f_{TX} - f_{OBS} = f_{NCO} \qquad \text{Equation 7}$$

$$f_{ref} * \left(N_{TX} + \frac{F_{TX}}{M}\right)\left(\frac{1}{2^{TXDIV}}\right) -$$

$$f_{ref} * \left(N_{OBS} + \frac{F_{OBS}}{M}\right)\left(\frac{1}{2^{OBSDIV}}\right) = f_{BB} * \left(\frac{FTW}{2^k - M_{ADJUST}}\right)$$

$$f_{ref} * \left(N_{TX} + \frac{F_{TX}}{M}\right)\left(\frac{1}{2^{TXDIV}}\right) - f_{ref} * \left(N_{OBS} + \frac{F_{OBS}}{M}\right)$$

$$\left(\frac{1}{2^{OBSDIV}}\right) = f_{ref} * N_{BB} * \left(\frac{FTW}{2^k - M_{ADJUST}}\right)$$

In certain configurations, the transmit and observation dividers can have equal value, since the transmit local oscillator and the observation local oscillator are operating in the same frequency range. In such a configuration, the local oscillators can have a value $2^{DIV}$, and Equation 7 can be rearranged to form Equation 8 below.

$$\left(N_{TX} - N_{OBS} + \frac{F_{TX} - F_{OBS}}{M}\right)\left(\frac{1}{2^{DIV}}\right) = N_{BB} * \left(\frac{FTW}{2^k - M_{ADJUST}}\right) \qquad \text{Equation 8}$$

$$\left(\frac{N_{TX} - N_{OBS}}{N_{BB}} + \frac{F_{TX} - F_{OBS}}{M * N_{BB}}\right)\left(\frac{1}{2^{DIV}}\right) = \left(\frac{FTW}{2^k - M_{ADJUST}}\right)$$

In one example, the modulus M is equal to the prime number $2^{23} - 15 = 8{,}388{,}593$. In such a configuration, $M_{ADJUST}$ can be selected to be equal to 15 such that $2^k - M_{ADJUST} = M$, which cancels the modulus M. In such a configuration, Equation 8 can be simplified to provide Equation 9 below.

$$\left(\frac{(N_{TX} - N_{OBS})(2^k - M_{ADJUST}) + (F_{TX} - F_{OBS})}{N_{BB} * 2^{DIV}}\right) = FTW \qquad \text{Equation 9}$$

Typically, $N_{TX}$ and $N_{OBS}$ may be the same code or within a few codes of each other. Additionally, in certain configurations, $N_{BB}$ is a small power of 2. When the integer dividers $N_{TX}$ and $N_{OBS}$ for the transmit and observation channels are equal, then FTW can be expressed by the fractional divider ratios as given by Equation 10 below.

$$FTW = \frac{(F_{TX} - F_{OBS})}{N_{BB} * 2^{DIV}} \qquad \text{Equation 10}$$

The fractional portion of the observation PLL's division rate $F_{OBS}$ can be selected such that FTW resolves to an integer with no fractional remainder.

Although one example of equations for an RF communication and digital modulator have been provided, other equations are possible. For example, the equations can vary with application and/or implementation.

Additional details of the digital modulator 210 can be as described earlier.

Applications

Devices employing the above described schemes can be implemented into various electronic devices. Examples of the electronic devices can include, but are not limited to, consumer electronic products, parts of the consumer electronic products, electronic test equipment, etc. Examples of the electronic devices can also include circuits of optical networks or other communication networks. The consumer electronic products can include, but are not limited to, an automobile, a camcorder, a camera, a digital camera, a portable memory chip, a washer, a dryer, a washer/dryer, a copier, a facsimile machine, a scanner, a multi-functional peripheral device, etc. Further, the electronic device can include unfinished products, including those for industrial, medical and automotive applications.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A method of transceiver calibration comprising:
   generating a transmit local oscillator signal of a first frequency using a transmit local oscillator;
   mixing a transmit signal and the transmit local oscillator signal using a transmit mixer of a transmit channel;
   generating an observation local oscillator signal of a second frequency different from the first frequency using an observation local oscillator;
   generating an observation signal from the transmit channel;

mixing the observation signal and the observation local oscillator signal using an observation mixer of an observation channel; and detecting impairments of the transmit channel based on an output signal of the observation channel using a transmit error correction circuit.

2. The method of claim 1, wherein detecting impairments of the transmit channel based on the output signal comprises detecting impairments of the transmit channel without calibrating the observation channel for quadrature error beforehand.

3. The method of claim 1, wherein detecting impairments of the transmit channel comprises detecting at least one of a quadrature error or a leakage of the transmit local oscillator.

4. The method of claim 1, wherein detecting impairments of the transmit channel comprises performing digital predistortion (DPD) observations to determine channel non-linearity.

5. The method of claim 1, further comprising compensating for a frequency difference between the transmit local oscillator signal and the observation local oscillator signal using a digital modulator of the observation channel.

6. The method of claim 5, wherein compensating for the frequency difference comprises generating an accumulated phase signal based on a frequency tuning word using a phase accumulator, generating a continuous wave signal based on the accumulated phase signal using a phase-to-amplitude converter, and generating the output signal of the observation channel based on the continuous wave signal using a digital mixer.

7. The method of claim 6, further comprising controlling an adjustable modulus of the phase accumulator.

8. The method of claim 7, wherein controlling the adjustable modulus of the phase accumulator comprises adjusting a value of the accumulated phase signal at phase origin crossings based on the adjustable modulus.

9. The method of claim 1, further comprising generating a digital transmit in-phase (I) signal and a digital transmit quadrature-phase signal using a digital transmit signal, and correcting for a quadrature error of the transmit channel based on controlling an amplitude of at least one of the digital transmit I signal or the digital transmit Q signal.

10. The method of claim 1, further comprising generating the transmit signal based on low pass filtering using a low pass filter, and correcting for a quadrature error of the transmit channel based on controlling a group delay of the low pass filter.

11. The method of claim 1, wherein generating the transmit local oscillator signal comprising generating a transmit local oscillator I signal using a first output of the transmit local oscillator and generating a transmit local oscillator Q signal using a second output of the transmit local oscillator, and correcting for a quadrature error of the transmit channel based on controlling at least one of a capacitance of the first output or a capacitance of the second output.

12. The method of claim 1, further comprising compensating for a leakage of the transmit local oscillator based on applying a DC offset to the transmit signal.

13. A transceiver comprising:
a transmit channel comprising:
a transmit local oscillator configured to generate a transmit local oscillator signal of a first frequency; and
a transmit mixer configured to mix a transmit signal and the transmit local oscillator signal;
an observation channel comprising:
an observation local oscillator configured to generate an observation local oscillator signal of a second frequency different from the first frequency; and
an observation mixer configured to mix an observation signal generated from the transmit channel and the observation local oscillator signal; and
a transmit error correction circuit configured to detect impairments of the transmit channel based on an output signal of the observation channel.

14. The transceiver of claim 13, wherein the observation channel further comprises a digital modulator configured to compensate for a frequency difference between the transmit local oscillator signal and the observation local oscillator signal.

15. The transceiver of claim 14, wherein the digital modulator comprises a phase accumulator configured to generate an accumulated phase signal based on a frequency tuning word, a phase-to-amplitude converter configured to generate a continuous wave signal based on the accumulated phase signal, and a digital mixer configured to generate the output signal of the observation channel based on the continuous wave signal.

16. The transceiver of claim 15, wherein the phase accumulator is configured to operate with an adjustable modulus.

17. The transceiver of claim 16, wherein the phase accumulator is configured to adjust a value of the accumulated phase signal at phase origin crossings based on the adjustable modulus.

18. The transceiver of claim 13, wherein the transmit channel further comprises a digital transmit circuit configured to generate a digital transmit in-phase (I) signal and a digital transmit quadrature-phase signal, wherein the transmit error correction circuit is configured to correct for a quadrature error of the transmit channel based on controlling an amplitude of at least one of the digital transmit I signal or the digital transmit Q signal.

19. The transceiver of claim 13, wherein the transmit channel further comprises a low pass filter configured to generate the transmit signal, wherein the transmit error correction circuit is configured to correct for a quadrature error of the transmit channel based on controlling a group delay of the low pass filter.

20. The transceiver of claim 13, wherein the transmit local oscillator includes a first output that generates a transmit local oscillator I signal and a second output that generates a transmit local oscillator Q signal, wherein the transmit channel further comprises a variable capacitor array electrically connected to the first and second outputs, wherein the transmit error correction circuit is configured to correct for a quadrature error of the transmit channel based on controlling the variable capacitor array.

21. The transceiver of claim 13, wherein the transmit error correction circuit is configured to correct for a leakage of the transmit local oscillator based on controlling a DC offset of the transmit signal.

* * * * *